United States Patent [19]

Méry et al.

[11] Patent Number: 4,614,254

[45] Date of Patent: Sep. 30, 1986

[54] BRAKING SYSTEM INCORPORATING AT LEAST ONE SLIDING BRAKE DISC

[75] Inventors: Jean C. Méry, Pavillons Sous Bois; Alain Thioux, Chennevieres; Guy Meynier, Aulnay Sous Bois, all of France

[73] Assignee: Societe Anonyme D.B.A., Paris, France

[21] Appl. No.: 675,161

[22] Filed: Nov. 27, 1984

[30] Foreign Application Priority Data

Nov. 30, 1983 [FR] France ............................. 83 19140
May 30, 1984 [FR] France ............................. 84 08544

[51] Int. Cl.⁴ ............................................. F16D 55/36
[52] U.S. Cl. ..................................... 188/71.5; 184/5; 188/71.1; 188/264 B; 192/70.12; 192/70.2; 464/16; 384/13
[58] Field of Search ........ 188/264 E, 264 CC, 264 B, 188/71.1, 71.5, 71.8, 73.46; 192/70.12, 70.13, 70.2, 113 B; 464/16, 24, 96; 184/5; 308/5 R

[56] References Cited

U.S. PATENT DOCUMENTS

| 1,328,491 | 1/1920 | Campbell | 188/366 |
|---|---|---|---|
| 1,769,158 | 7/1930 | Oechsle | 464/16 |
| 2,462,659 | 2/1949 | Molotzak | 184/5 X |
| 2,928,504 | 3/1960 | Hahn et al. | 188/264 E X |
| 3,010,542 | 11/1961 | Graber | 188/71.5 |
| 3,577,746 | 5/1971 | Dolan | 464/16 |
| 3,580,368 | 5/1971 | Heck | 188/264 E |
| 3,705,641 | 12/1972 | Brooks et al. | 188/73.46 |
| 3,707,207 | 12/1972 | Kondo | 188/71.5 |

FOREIGN PATENT DOCUMENTS

| 40049 | 11/1981 | European Pat. Off. . | |
|---|---|---|---|
| 1320022 | 1/1963 | France . | |
| 912423 | 12/1962 | United Kingdom | 184/5 |
| 1201438 | 8/1970 | United Kingdom . | |

Primary Examiner—George E. A. Halvosa
Attorney, Agent, or Firm—Larry J. Palguta; Ken C. Decker

[57] ABSTRACT

The braking system incorporates at least one brake disc disc (26 36) mounted so as to slide axially on a hub (22) along key mechanisms (30, 32). According to the invention the braking system incorporates an integral device for forced greasing (60) of the key mechanisms (30, 32) formed by two sealed chambers with variable volumes joined to one another by way of the key mechanisms (30, 32).

11 Claims, 5 Drawing Figures

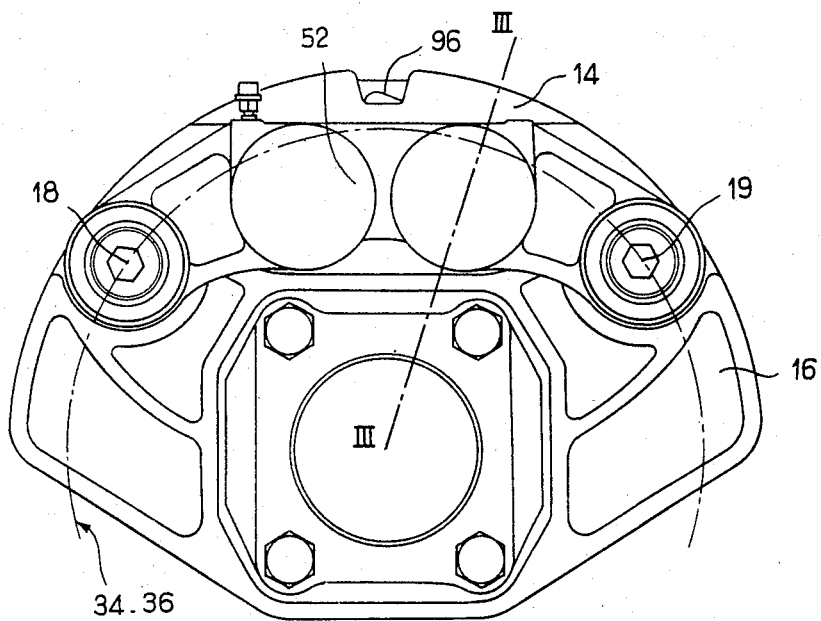
FIG_1
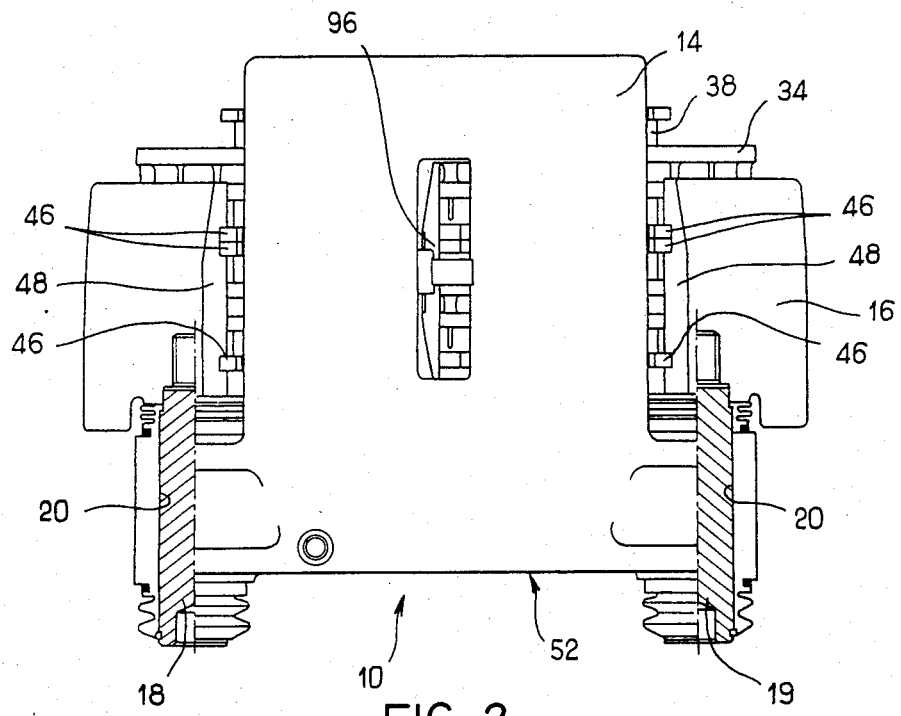
FIG_2

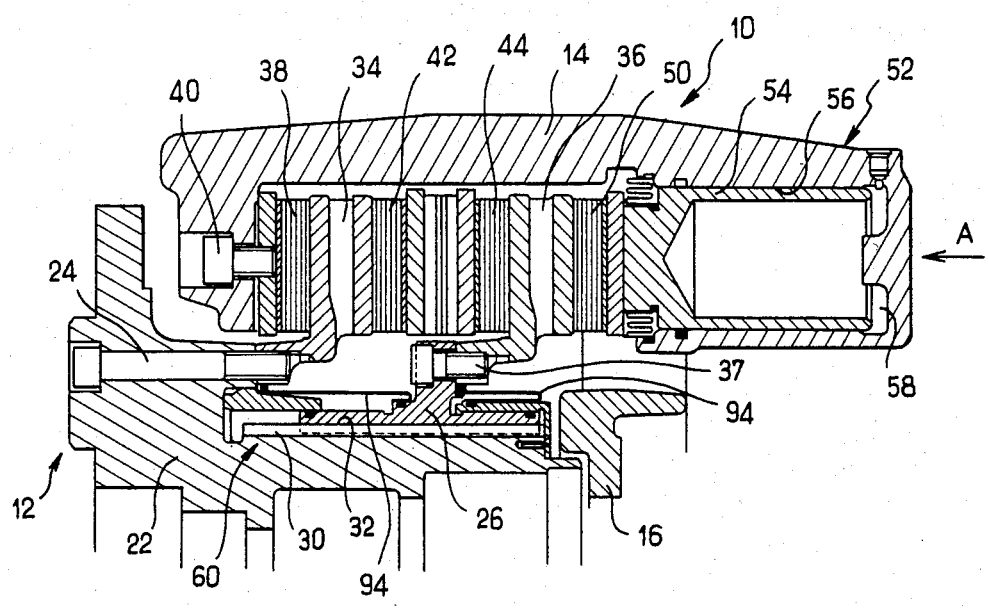
FIG_3
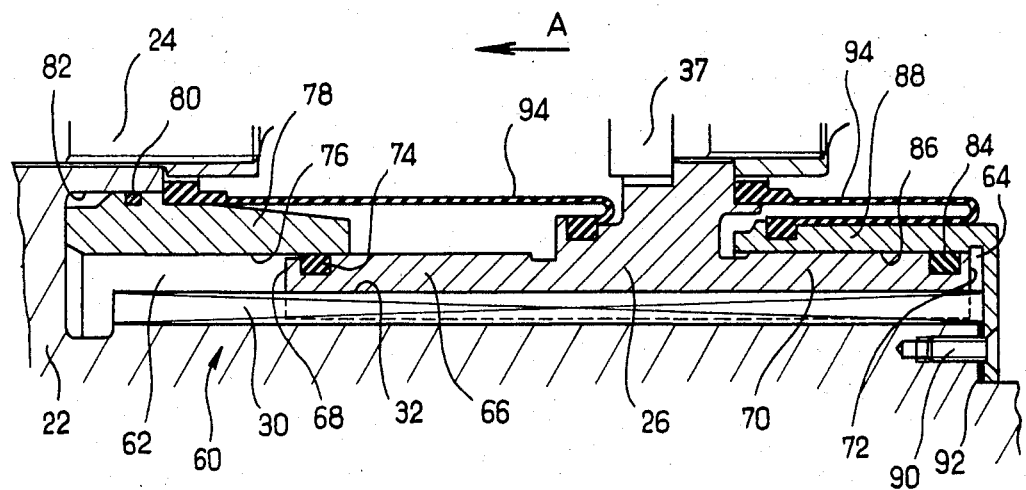
FIG_4

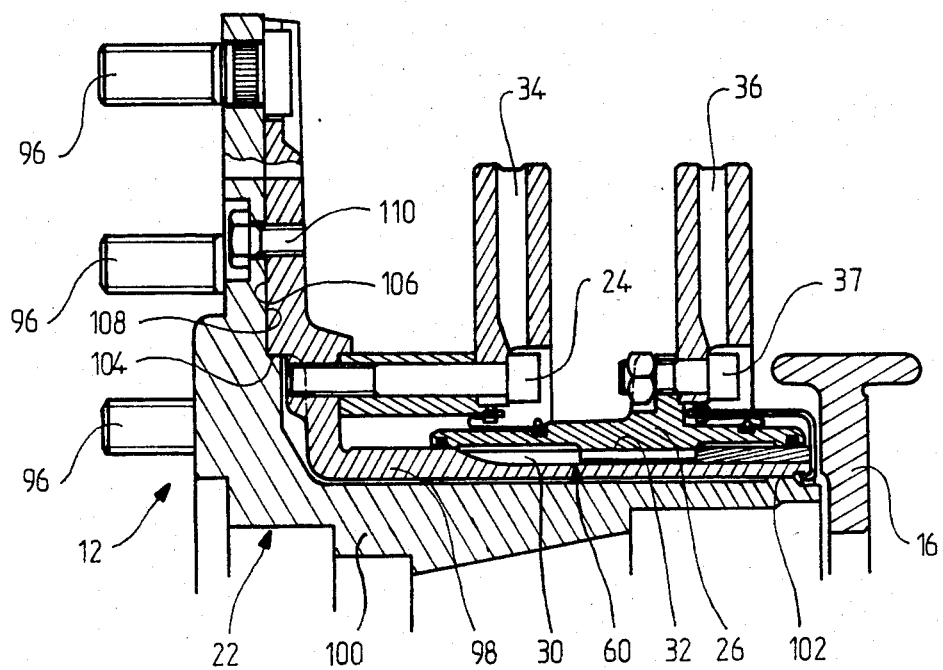
FIG_5

BRAKING SYSTEM INCORPORATING AT LEAST ONE SLIDING BRAKE DISC

The present invention relates to a braking system incorporating at least one brake disc which is mounted so as to slide on a rotating driven component along key means, and is particularly suitable for use in motor vehicles.

The invention relates more particularly to a braking system of the disc brake type in which the caliper incorporates a brake actuator which causes a friction component to engage first surface of a rotating disc, and indirectly causes the frictional engagement of a second friction component with the disc through the disc sliding on a rotating driven component.

A braking system of the type described above is known from U.S. Pat. No. 2,985,259 in which a fixed caliper houses three slideably mounted friction components, between which are interposed discs sliding on a rotating driven component. In this type of braking system, the sliding discs must be capable of transmitting the braking torque to the rotating driven component, but do not require particular axial guidance due to the fact that the brake actuators are uniformly circumferentially spaced and there is no risk of them blocking the sliding motion of the disc by jamming on the guiding splines. To avoid jamming in a splined system, it is known that the guides may be lengthened axially, as much on the fixed portion as on the sliding portion, and the longer these guides, the less chance there is of the disc being jammed. The risks of jamming are also reduced by lubricating the sliding zones. However, the greater the guiding length, the more difficult it is to ensure correct lubrication over the whole length of the working splined portion, more especially because the sliding disc only completes its full travel when the friction components have become fully worn. It is possible that, between two changes of friction components, the disc may become jammed through lack of lubrication, thus depriving the vehicle of all, or part, of its braking.

The object of the present invention is to provide a braking system in which such disadvantages are avoided.

Accordingly, the invention proposes a braking system incorporating at least one brake disc capable of being braked by means of friction components, the said disc being mounted so as to slide axially on a rotating driven component along key means, characterized in that the said braking system incorporates an integral device for forced greasing of the said key means.

It will thus be apparent that, according to the invention, the means of sliding the disc on the driven component are lubricated in a systematic manner, independently of the state of wear of the friction components.

According to another aspect of the present invention the device for forced greasing is used to return the disc over a certain predetermined length after braking has ceased, and to hold the disc in this position, in order to prevent undesirable movement of the latter.

A further object of the present invention is to facillitate the machining of the key means on the hub of the vehicle and to reduce the risk of embrittlement. A still further object of the invention is to simplify the assembly of the sliding hub and the device for forced greasing, especially when this assembly has to be carried out in dirty or contaminated conditions where the entry of dirt into the key means during assembly may lead to jamming of the disc and considerable loss of the vehicle's braking. In accordance with a further aspect of the present invention the driven member comprises two component parts, one of which, together with the device for forced greasing of the key means, forms a sub-assembly which can be separately and completely removed from the other part. The use of such a detachable sub-assembly means that the key means can easily be machined and that the device can safety be assembled in dirty or contaminated conditions.

The invention will now be described by way of example with reference to the accompanying drawings, in which:

FIG. 1 is an end view of a braking system according to the invention;

FIG. 2 is a plan view of the braking system shown in FIG. 1, in which certain portions are shown in section;

FIG. 3 is a section taken along the line III—III of the braking system shown in FIG. 1;

FIG. 4 is a partial enlarged view of the integral device for forced greasing shown in FIG. 3; and FIG. 5 is a section of a second embodiment of a braking system according to the invention.

The braking system shown in FIG. 1 to 3 incorporates a disc brake, generally shown by reference 10. The disc brake 10 incorporates, in a conventional manner, a caliper 14 slideably mounted on a fixed support 16 by means of two axial pins 18 and 19 attached to the fixed support 16 and which extend through bores 20 formed in the caliper 14. In a conventional manner, the fixed support 16 is joined to a fixed portion of the vehicle (not shown).

The rotating assembly 12 is joined to a wheel of the vehicle (not shown). This rotating assembly 12 incorporates a wheel hub 22 to which are fixed by means of screws 24, firstly, a fixed brake disc 34, and secondly a sliding disc 26, 36 formed in the embodiment shown by a sliding hub 26 to which a brake disc 36 is fixed by means of screws 37. The sliding hub 26 is firmly fixed in rotation to the hub 22 by splines formed on the hub 22 which enter grooves 32 formed in the hub 26, the sliding hub 26 being capable of being displaced axially along the splines 30. In the embodiment shown, the hub 22 is thus the rotating driven component of the disc 26, 36, the splines 30 and the grooves 32 forming the key means.

The disc brake incorporates friction components positioned between the discs 34 and 36. More precisely, the disc brake 10 incorporates four friction components, a first friction component 38 fixed to the caliper 14 by means of screws 40; second and third friction components 42 and 44, respectively, positioned back to back between the discs 34 and 36 are supported by lugs 46 on sliding surfaces 48 formed on the fixed support 16; lastly a fourth friction component 50 positioned between the disc 36 and a brake actuator 52 firmly fixed to the caliper. The friction component 50 is also supported by sliding surfaces 48 of the fixed support 16 by means of lugs 46 in a manner similar to that of the friction components 42 and 44. In the embodiment shown, the brake actuator 52 is of the twin type, each half incorporating a piston 54 slideably mounted in a bore 56 formed in the caliper 14, the piston 54 being responsive to pressure existing in a chamber 58, capable of being joined to a source of hydraulic pressure such as, for example, the master cylinder of the vehicle (not shown).

According to the invention, the braking system incorporates an integral device for forced greasing of the key means, generally shown by reference 60, positioned in the region of the key means. Referring to FIG. 4, in which the integral device for forced greasing 60 is shown enlarged, it is seen that the latter incorporates two chambers 62 and 64, one positioned on each side of the hub 26 incorporating, firstly, a first annular extension 66 whose axial end 68 forms a movable wall of the chamber 62, and secondly a second extension 70 whose axial end 72 forms a movable wall for the chamber 64. The annular extension 66 carries on its outer diameter a sliding seal 74, which co-operates with a cylindrical portion 76 formed on a component 78, attached to the hub 22 in such a way that it is sealed by means of a fixed seal 80, the component 78 being force fitted into a bore 82 formed in the hub 22. In a similar way, the annular extension 70 carries a sliding seal 84 on its outside diameter, this seal co-operating with a cylindrical portion 86 formed in another component 88 firmly fixed to the hub 22 by screws 90 uniformly spaced on the circumference. The other component 88 is also mounted in such a way that it is sealed relative to the hub 22 by a fixed seal 92 positioned between the other component 88 and an end portion of the hub 22. In the embodiment shown, the diameters of the cylindrical portions 76 and 86 are identical, and the same applies to the external diameters of the extensions 66 and 70, and thus to the seals 74 and 84.

As may be seen in FIGS. 3 and 4, protective sealing boots 94 are mounted on each side of the sliding hub 26 between the latter and the wheel hub 22.

Referring to FIGS. 1 and 2, it is seen that a spring 96, positioned on the caliper 14, pushes the friction components 42, 44 and 50 radially so as to bear on the sliding surfaces 48 carried by the fixed support 16.

Lastly, in accordance with the invention, the annular chambers 62 and 64 are provided with lubricating agent, which in the embodiment shown is grease.

The brake, which has been described above with reference to FIGS. 1 to 4, operates in the following manner: When fluid under pressure is admitted into the chamber 58, the piston 54 is displaced in the direction of arrow A, shown in FIG. 3, relative to the caliper 14. The piston 54 forces the friction component 50 against the disc 36. The disc 36, under the thrust of the piston 54, is also displaced in the direction of arrow A and displaces the friction components 44 and 42, also in the direction of arrow A, until the friction component 42 comes to bear against the fixed disc 34. By reaction, the caliper 14 is displaced in the direction opposite to that of arrow A and applies the friction component 38 to the other surface of the disc 34, the caliper being free to slide on its pins 18 and 19. The small movement of the sliding disc, that is to say the sliding assembly of hub 26 and disc 36, of course causes the displacement of the two extensions 66 and 70 of the hub 26, and thus the displacement of the movable walls 68 and 72 of the chambers 62 and 64. This displacement of the movable walls corresponds to a reduction in volume of the chamber 62 and an increase in volume of the chamber 64. As the chambers 62 and 64 are sealed, firstly by the seals 80 and 74, and secondly by the seals 92 and 84, respectively, the grease contained in the chamber 62 is forced between the splines 30 and the grooves 32, thus ensuring forced greasing of the key means. During the displacement of the hub 26, the sliding seals 74 and 84 are slightly deformed due to their friction on the cylindrical portions 76 and 86 and, on termination of braking these seals 74 and 84 tend to make the hub 26 return in the direction opposite to that of arrow A over a length predetermined by their geometry, as in currently used on pistons for disc brakes. This return movement also causes a variation in the volumes of the chambers 62 and 64, but in the opposite direction to that which occured previously, in other words the chamber 64 reduces in volume and consequently the grease is pushed back along the splines and the grooves towards the chamber 62, also ensuring forced greasing. It will be noted that the friction of the seals 74 and 84 on the cylindrical portions 76 and 86 prevents undesirable movement of the sliding assembly of disc and hub 36 and 26.

In addition to these small movements due to braking application, the position of the sliding hub 26 relative to the hub 22 advances gradually due to the wear of the friction components. In other words the chamber 62 reduces in volume gradually due to the wear of the linings, while the chamber 64 increases in volume. This movement, of large amplitude but taking place over a long time, allows practically all the grease contained in the chamber 62 to be transferred to the chamber 64, and in this way the sliding hub benefits during this time from the renewal of the grease contained in the splines and the grooves. It will be observed then, that as the grease, after the friction components have become worn, is located in the chamber 64, it is easy to replace it or to top it up by removing the screws 90 and the component 88. It is then only necessary to displace the disc 26, 36 in the direction opposite to that of arrow A to transfer this grease from the chamber 64 to the chamber 62, the integral device for forced greasing then being in a condition to be put into operation as explained above.

The braking system described above is assembled in the following manner: The vehicle is first fitted with the fixed support 16 mounted on a fixed portion of the vehicle (not shown). The componet 78 is next mounted on the hub 22, taking care to mount the seal 80. The disc 34 is then mounted on the hub 22 by means of the screws 24. The chamber 62 is then filled with grease and the hub 26, previously fitted with the disc 36 and the sealing boot 94, is mounted on the splines 30. A soon as the seal 74 reaches the cylindrical portion 76, the chamber 62 becomes sealed and any advance of the hub 26, in the direction of the arrow A shown in FIG. 4, causes forced greasing of the splines and the grooves. When the hub 26 reaches the position shown in FIG. 4, the other component 88 is placed in position taking care to interpose the seal 92 and to tighten the screws 90 correctly. The other sealing boot 94 is then finally placed in position. The rotating assembly 12 can then be placed in position on the vehicle, in a conventional manner, on the stub axle (not shown).

The assembly of the brake is next carried out. The friction components 42, 44 and 50 are placed close to the discs 34 and 36 and come to bear, by their lugs 46, against the sliding surfaces 48 of the fixed support 16. The caliper 14, previously equipped with its brake actuator 52 and with the friction component 38, screwed to this caliper by means of screws 40, is then offered radially so as to straddle the discs 34 and 36. The mounting of the pins 18 and 19 is then carried out by passing them through bores 20 in the caliper 14, then screwing them into the fixed support 16 by means of threads provided for this purpose.

Dismantling the braking system is carried out in the reverse order of the operations just described.

FIG. 5 is a section of a second embodiment of a braking system according to the present invention from which the brake itself has been omitted in the interests of clarity.

The braking system shown in FIG. 5 includes a rotating assembly generally shown by reference 12 which is attached to a vehicle wheel (not shown) by a number of screws 96 which are circumferentialty spaced at regular intervals. The rotating assembly 12 comprises a hub 22 which is formed in two separate parts, a first part 98 which includes the device for forced greasing 60, and a second part 100 which carries the screws 96. A fixed brake disc 34 is attached to the first part 98 by means of screws 24. A sliding disc 26, 36, which in the embodiment shown comprises a sliding hub 26 on which a braking disc 36 is fixed by means of screws 37, is also slideably mounted on the first part 98. The second part 100 has two centering surfaces 102 and 104 on which two corresponding cylindrical surfaces formed on the first part 98 abut to ensure the relative alignment of the first and second parts 98 and 100. The two parts 98 and 100 each comprise a respective opposing face 106 and 108 which are maintained in abutment by means of screws 110 which attach the two parts 98 and 100 together and ensure that the two parts rotate together. It should be noted that the rotation of the first part 98 by the second part 100 is brought about essentially by the friction between the two opposing faces 106 and 108 arising due to the screws 100 which are regularly circumferentially spaced and ensure that the two parts 98, 100 are uniformly urged together.

As the operation of the braking system of the second embodiment is similar to that of the first it will not be described in detail.

From the above description it can be seen that the first part 98, which includes the device for forced greasing formed, inter alia, by the sliding hub 26, can be removed from the second part 100 simply by unscrewing the screws 110; no action needing to the taken as regards the key means 30, 32. This feature means that the key means and the device for forced greasing can be safely prepared and assembled away from dirt or contamination.

In addition, as the key means are formed on the first and second parts 98, 100 the machining of the hub 22 is kept to a minimum and thus the risk of embrittlement, which can arise when machining a forged component such as the hub, is minimized. The only necessary machining of the hub is confined to the formation of the two centering surfaces 102 and 104.

It is clear that the invention is not limited to the embodiments shown; in particular, the chambers 62 and 64 may be filled with a liquid lubricant, and corresponding filling means would then be provided on the other component 88. In the same way, it may be arranged that the cylindrical portions 76 and 86 are not of the same diameter to as to benefit from a variation in volume of the assembly of the chambers 62, 64 and to obtain forced greasing assisted by the differential effect of the pressures generated on each side of the sliding hub 26. Also the component 78 may be provided in one piece with the hub 22, or the function of the seal 80 may be carried out by the rim of the membrane 94 which is adjacent to it. Finally, other modifications may be arranged without thereby departing from the framework of the invention.

We claim:

1. A multi-disc brake comprising a first rotary disc solid with a wheel hub and a second rotary disc mounted on the hub for sliding movement parallel to an axis of the hub, the axis of the hub and axes of the discs coinciding with one another, and an assembly of friction blocks incorporating friction linkings capable of engaging faces of the discs by means of an hydraulic actuating device, the linings extending only over a limited angular sector of the periphery of the discs, the second rotary disc carried by an internally splined sleeve which slides on an externally splined part of the wheel hub, splines of the sleeve and hub forming key means and engaged with one another to drive rotationally the second rotary disc with the wheel hub, characterized in that the brake includes a mechanism for forced greasing of the splines of said key means, the mechanism having two sealed chambers provided with a lubricating agent and connected by means of spacings between said splines, the sleeve having annular axial extensions at axial ends thereof, the axial extensions each slidably and sealingly engaging an axially stationary wall of the respective chamber in order to form portions of the sealed chambers, the sealed chambers being disposed at the wheel hub.

2. The brake according to claim 1, characterized in that the chambers are variable volume chambers by means of movable radial walls each disposed at an end of an axial extension.

3. The brake according to claim 1, characterized in that the sealed chambers are defined by the wheel hub, stationary walls, internally splined sleeve and axial extensions.

4. The brake according to claim 1, characterized in that the axial extensions are equipped with sliding seals cooperating with cylindrical portions forming the stationary walls, the cylindrical portions firmly fixed to the wheel hub and the seals providing the sealing engagement.

5. The brake according to claim 4, characterized in that the sliding seals form means for returning the second rotary disc over a predetermined length, and for holding the second rotary disc in place after braking has ceased.

6. The brake according to claim 5, characterized in that the cylindrical portions are sealingly attached to the wheel hub.

7. The brake according to claim 6, characterized in that one of the cylindrical portions is removable and allows access to the lubricating agent.

8. The brake according to claim 1, characterized in that the wheel hub comprises first and second associated parts of which the first associated part and mechanism form a separate subassembly which can be detached from the second associated part.

9. The brake according to claim 8, characterized in that the two sealed chambers remain sealed after removal of the subassembly from the second associated part of the wheel hub.

10. The brake according to claim 9, characterized in that the second associated part comprises centering surfaces for the first associated part, and attachment means provided for the associated parts to insure that the first and second associated parts are attached and rotate together.

11. The brake according to claim 10, characterized in that the attachment means comprises opposing faces each formed respectively on one of the first and second associated parts and urged together by screw means.

* * * * *